A United States Patent
Andrew et al.

(10) Patent No.: US 7,337,308 B2
(45) Date of Patent: Feb. 26, 2008

(54) SYSTEM AND METHOD FOR INITIATING DIALUP CREATION FROM MODEM CONNECTION TO A MOBILE DEVICE

(75) Inventors: Felix G. T. I. Andrew, Seattle, WA (US); Shawn M. Brown, Redmond, WA (US); Justin M. Maguire, III, Seattle, WA (US); Chad Whitney, Seattle, WA (US); Harm Lambertus Lamberts, Seattle, WA (US); Zeke Koch, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 363 days.

(21) Appl. No.: 10/295,480

(22) Filed: Nov. 15, 2002

(65) Prior Publication Data

US 2004/0098572 A1 May 20, 2004

(51) Int. Cl.
*G06F 9/00* (2006.01)
*G06F 15/177* (2006.01)
(52) U.S. Cl. .............................. 713/1; 713/2; 713/100
(58) Field of Classification Search ............... 713/1, 713/100, 182, 2
See application file for complete search history.

(56) References Cited

U.S. PATENT DOCUMENTS 6,301,012 B1 * 10/2001 White et al. ............... 358/1.15
6,735,767 B1 * 5/2004 Bleizeffer et al. ............ 717/174
2002/0069353 A1 * 6/2002 Smith ............................ 713/1
2002/0140966 A1 * 10/2002 Meade et al. .............. 358/1.15
2002/0152336 A1 * 10/2002 Tso ............................. 710/8
2003/0009604 A1 * 1/2003 Howard et al. ............. 709/327
2003/0037325 A1 * 2/2003 Hargrove et al. ........... 717/175
2003/0051084 A1 * 3/2003 Rosen ......................... 710/72

(Continued)

OTHER PUBLICATIONS

"NTS Simplifies Broadband Experience With EnterNet Subscriber Access Software: EnterNet Only PPP Over Ethernet Client Software to Support VPN Access," Newswire, Apr. 20, 1999, 2 pages.

(Continued)

*Primary Examiner*—Rehana Perveen
*Assistant Examiner*—Michael J. Brown
(74) *Attorney, Agent, or Firm*—Merchant & Gould; Ryan T. Grace

(57) ABSTRACT

Described is a method and system for initiating configuration of a modem connected to a mobile device. The system and method provide a mechanism for guiding a user through the setup process in order to simplify the user's connectivity to a network using the modem. In one embodiment, the mechanism monitors for when a modem is connected to the mobile device. When a modem is connected for the first time, the mobile device launches a wizard utility that directs the user's configuration of the connected modem. The user is able to choose from performing an initial configuration of the modem, or migrating settings of a previously connected modem to establish the connected modem's settings. Thus, the user is guided through the configuration process, increasing the discoverability of the modem and simplifying its setup for the user.

24 Claims, 6 Drawing Sheets

U.S. PATENT DOCUMENTS

| | | |
|---|---|---|
| 2003/0097433 A1* | 5/2003 | Park et al. .................. 709/222 |
| 2003/0123082 A1* | 7/2003 | Hall et al. ................. 358/1.15 |
| 2004/0098419 A1* | 5/2004 | Bantz et al. ................ 707/203 |
| 2004/0128420 A1* | 7/2004 | Su et al. ..................... 710/302 |
| 2004/0166834 A1* | 8/2004 | Omar et al. ............. 455/414.1 |
| 2004/0230863 A1* | 11/2004 | Buchhorn ..................... 714/6 |
| 2005/0015215 A1* | 1/2005 | Zhang ........................ 702/119 |

OTHER PUBLICATIONS

"*New Communications Product for the Windows CE Operating System Provides Access to Information Anywhere, Anytime,*" Newswire, Feb. 10, 1997, 8 pages.

\* cited by examiner

SYSTEM AND METHOD FOR INITIATING DIALUP CREATION FROM MODEM CONNECTION TO A MOBILE DEVICE

BACKGROUND OF THE INVENTION

Today, there a variety of mobile devices that are designed to have expandable architectures. For example, there are personal digital assistants, pocket PCs, laptop computers, and the like. Increasingly, these devices are including peripheral device ports or serial connections for adding hardware to the mobile device, expanding the mobile device's capabilities.

Additional hardware typically includes modems, network cards, additional memory, program cards, and the like. The additional functionality provided by these additional hardware options are similar to the additional functionality traditionally only offered by PC cards for computers. Plug-and-Play capabilities of mobile device have increased the interchangeability of these additional hardware options. With Plug-and-Play technology, hardware can be connected to a mobile device and used, often without resetting the system.

SUMMARY OF THE INVENTION

The present invention is directed to improved usability of hardware that is connected to a mobile device, namely modems. One aspect in which the usability is improved is by improving the discoverability of the modem. Even with plug-and-play technology, the discoverability of a modem connected to a mobile device is extremely limited. Discoverability addresses the user's capability to properly configure a modem or other hardware connected to a mobile device without burdensome requirements on the user's technical understanding of the hardware.

Typically, when a user has connected a modem to a mobile device, nothing occurs on the mobile device to indicate to the user the next step to take in configuring the modem for use. A number of data fields need to be filled out by the user in order to provide the user with connectivity to a network. For example, often the user is required to enter a telephone number for an internet service provider (ISP), a login associated with the user's account with that ISP, a password for verification, and the like. Without these settings or dial-up properties being entered, no connection with the network can be established.

The present invention provides increased discoverability for a modem connected to a mobile device by initiating a utility or wizard to guide the user through the initial setup process. The connection of a modem to the mobile device is monitored for and recognized. After the modem is connected, the user is provided with options for configuring the modem for use with the mobile device.

DETAILED DESCRIPTION OF THE PREFERRED EMBODIMENT

Briefly stated, the present invention is directed at efficiently downloading information of interest to a mobile device. The information of interest may be based on file types supported by the mobile device, the amount of storage available on the mobile device, and the like. These and other aspects of the invention will become apparent to those skilled in the art after reading the following detailed description.

Illustrative Operating Environment

Figure 1:
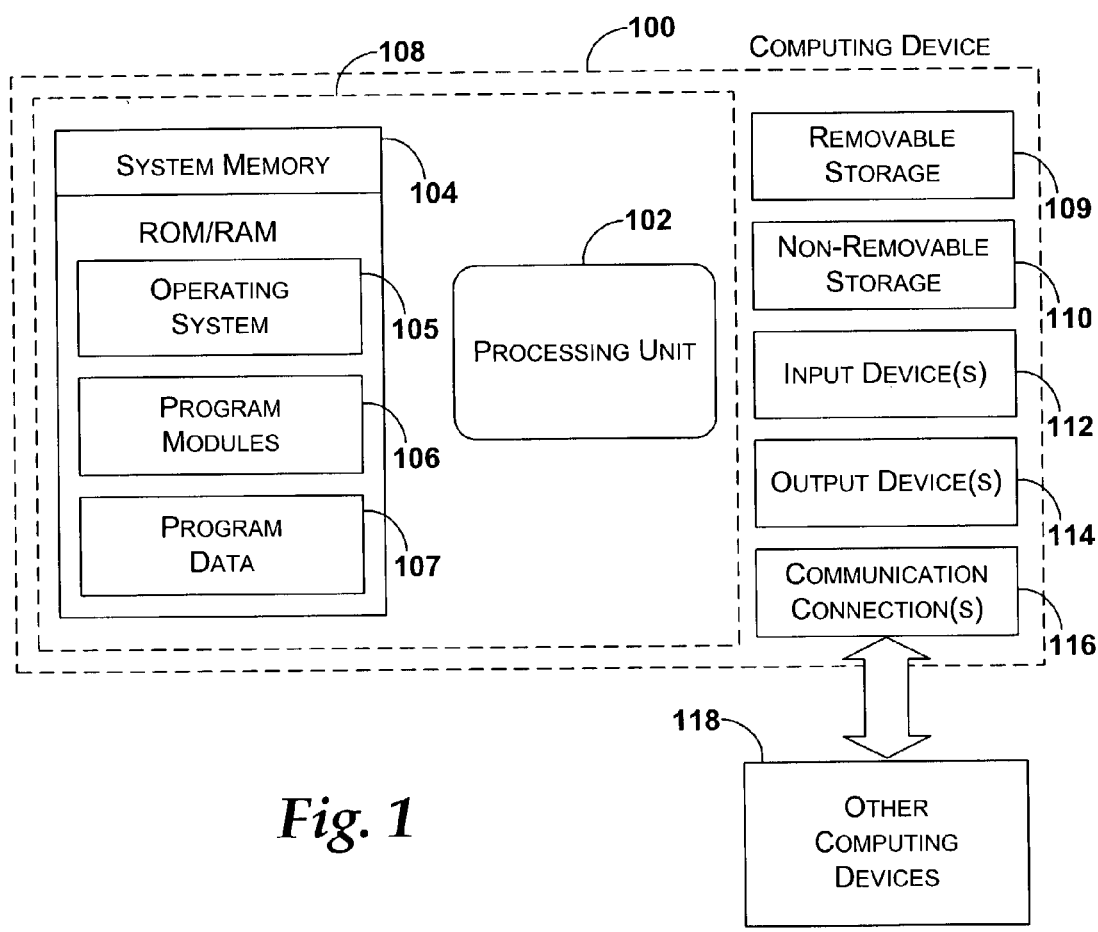
FIG. 1 illustrates an exemplary computing device that may be used in one exemplary embodiment of the present invention.

With reference to FIG. 1, one exemplary system for implementing the invention includes a computing device that may be configured to operate as a mobile device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

Computing device 100 may also contain communication connections 116 that allow the device to communicate with other computing devices 118, such as over a network. Communication connections 116 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
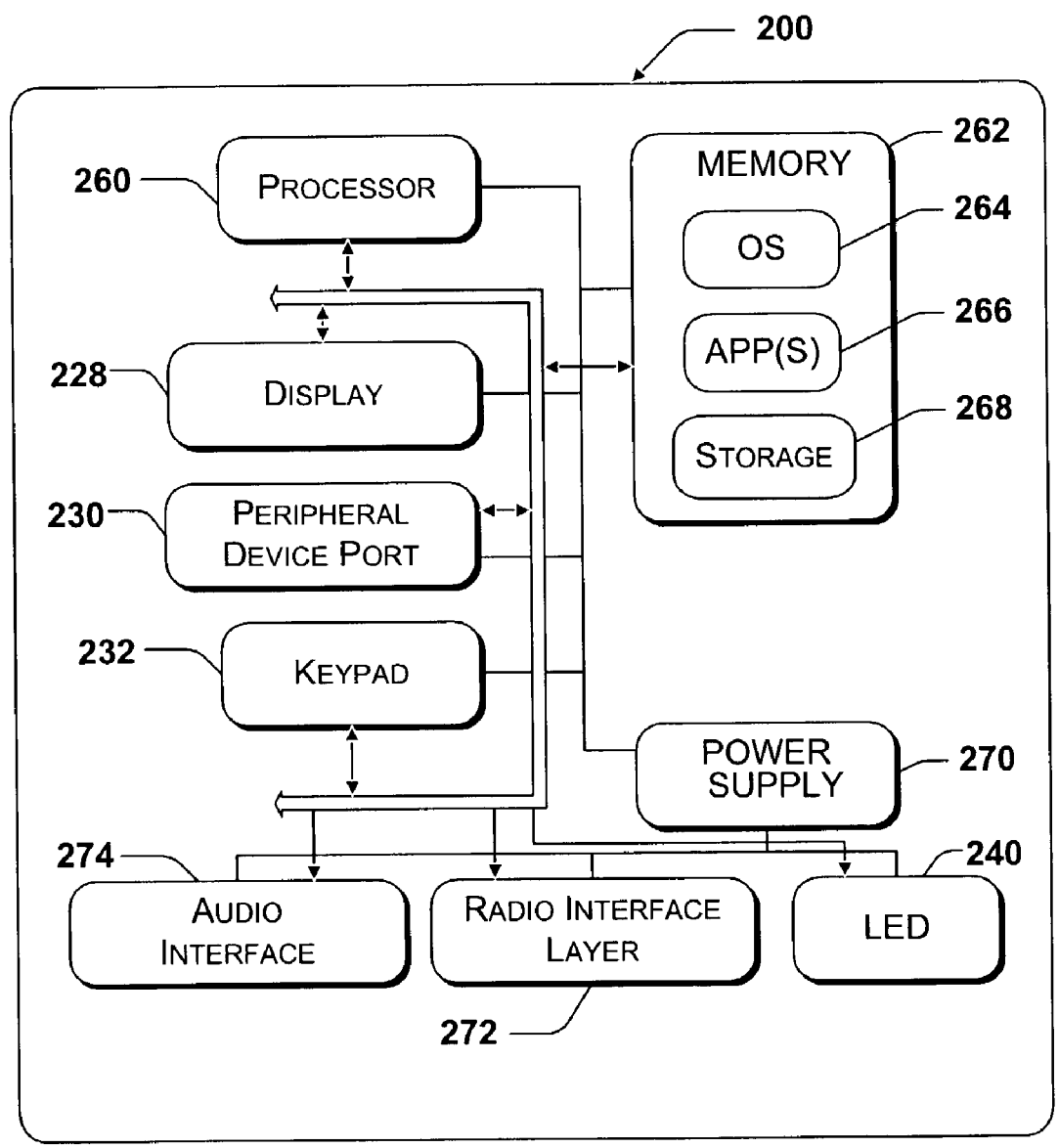
FIG. 2 illustrates an exemplary mobile device that may be used in one exemplary embodiment of the present invention.

With reference to FIG. 2, one exemplary system for implementing the invention includes a computing device configured as a mobile device, such as mobile device 200. The mobile device 200 has a processor 260, a memory 262, a display 228, peripheral device port 230, and a keypad 232. The memory 262 generally includes both volatile memory (e.g., RAM) and non-volatile memory (e.g., ROM, Flash Memory, or the like). The mobile device 200 includes an operating system 264, such as the Windows CE operating system from Microsoft Corporation or other operating system, which is resident in the memory 262 and executes on the processor 260. The keypad 232 may be a push button numeric dialing pad (such as on a typical telephone), a multi-key keyboard (such as a conventional keyboard). The display 228 may be a liquid crystal display, or any other type of display commonly used in mobile devices. The display 228 may be touch-sensitive, and would then also act as an input device. The peripheral device port 230 may be of the type to accept additional memory cards, game cards, modem cards, or other peripheral devices.

One or more application programs 266 are loaded into memory 262 and run on the operating system 264. Examples of application programs include phone dialer programs, installation wizard programs, email programs, scheduling programs, PIM (personal information management) programs, word processing programs, spreadsheet programs, Internet browser programs, and so forth. The mobile computing device 200 also includes non-volatile storage 268 within the memory 262. The non-volatile storage 268 may be used to store persistent information which should not be lost if the mobile computing device 200 is powered down. The applications 266 may use and store information in the storage 268, such as e-mail or other messages used by an e-mail application, contact information used by a PIM, appointment information used by a scheduling program, documents used by a word processing program, device driver programs, and the like.

The mobile computing device 200 has a power supply 270, which may be implemented as one or more batteries. The power supply 270 might further include an external power source, such as an AC adapter or a powered docking cradle, that supplements or recharges the batteries.

The mobile computing device 200 is also shown with two types of external notification mechanisms: an LED 240 and an audio interface 274. These devices may be directly coupled to the power supply 270 so that when activated, they remain on for a duration dictated by the notification mechanism even though the processor 260 and other components might shut down to conserve battery power. The LED 240 may be programmed to remain on indefinitely until the user takes action to indicate the powered-on status of the device. The audio interface 274 is used to provide audible signals to and receive audible signals from the user. For example, the audio interface 274 may be coupled to a speaker for providing audible output and to a microphone for receiving audible input, such as to facilitate a telephone conversation.

The mobile computing device 200 also includes a radio interface layer 272 that performs the function of transmitting and receiving radio frequency communications. The radio interface layer 272 facilitates wireless connectivity between the mobile computing device 200 and the outside world, via a communications carrier or service provider. Transmissions to and from the radio interface layer 272 are conducted under control of the operating system 264. In other words, communications received by the radio interface layer 272 may be disseminated to application programs 266 via the operating system 264, and vice versa.

Illustrative Process of Response to Modem Connection

Figure 3:
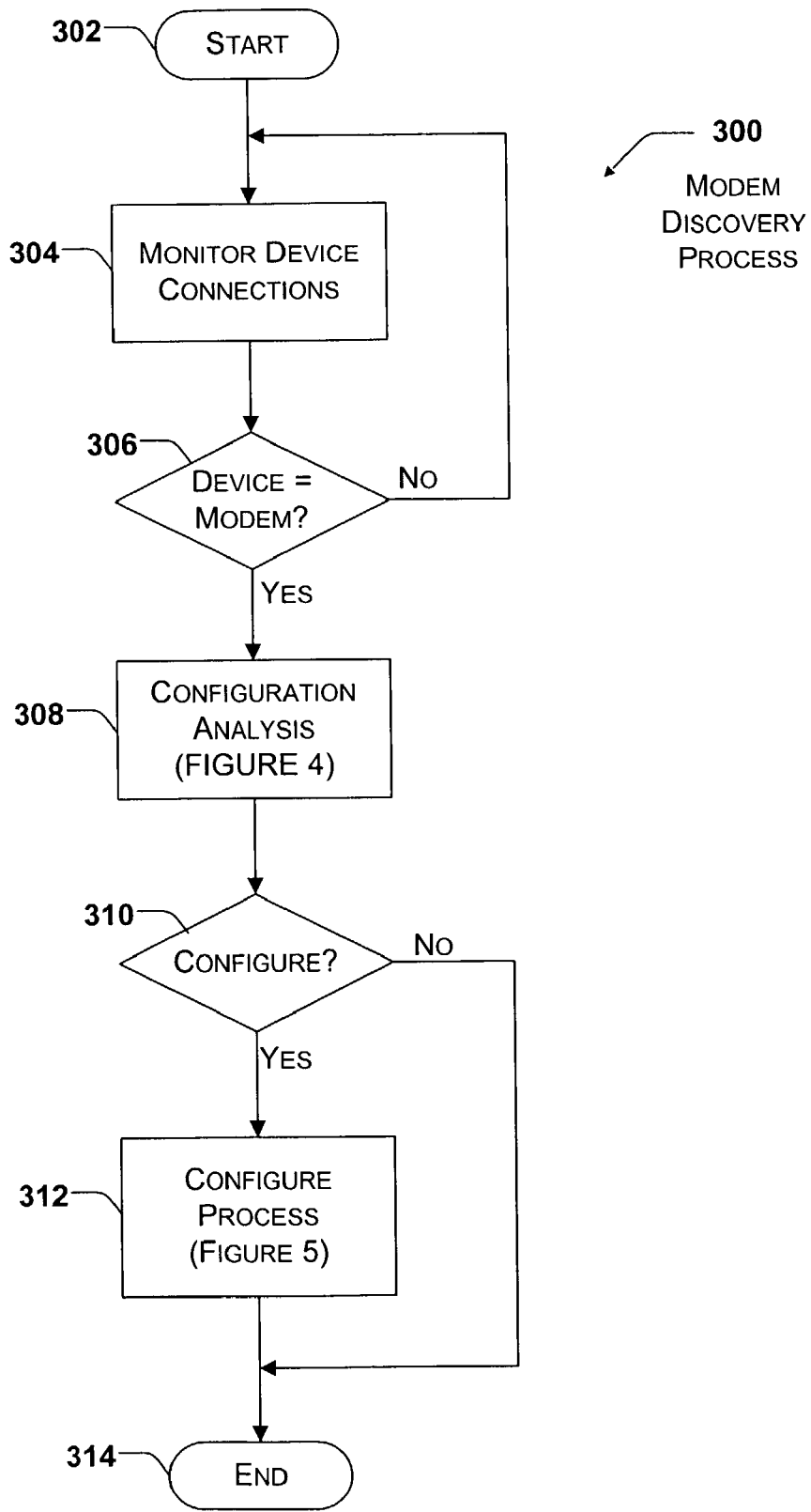
FIG. 3 is a logical flow diagram of an exemplary modem discovery process for a mobile device according to the present invention.

FIG. 3 is a logical flow diagram of an exemplary modem discovery process for a mobile device according to the present invention. The process 300 begins at start block 302 where the mobile device is powered on and available for connectivity to a peripheral device. The process 300 continues at block 304.

At block 304, the mobile device monitors the connections to the mobile device to determine when an external device is connected. In one embodiment, an internal process is continually run on the mobile device. The internal process monitors the mobile device for a notification that an external device has been connected. For example, on a "pocket PC" device the process monitors the pocket PC for a "WM_DEVICECHANGE" notification. A "WM_DEVICECHANGE" notification is a message that the operating system (OS) sends to indicate that an external device (e.g., external hardware) has been connected to or removed from the pocket PC. In one embodiment, the external device is connected through the peripheral device port 230 described in the discussion of FIG. 2 or through another connection (e.g., a USB "Universal Serial Bus" connection). When the monitoring process detects a device connection, the process 300 proceeds to decision block 306.

At decision block 306, a determination is made whether the external device connected to the mobile device is a modem. The internal process examines the notification to determine what type of device (e.g., modem, network card, hard drive, etc.) is connected. The internal process is capable of differentiating between devices of different types. When the external device connected to the mobile device is a modem, the process 300 continues at block 308. Otherwise, if the external device is not a modem, the process returns to block 304 where the internal process continues to monitor for external device connections.

At block 308, the mobile device determines the status of any previous configuration for the modem. The configuration includes whether the modem has any "dial-ups" or dialing properties already established. An exemplary process for analyzing whether any configuration exists for the connected modem is described in according to FIG. 4 below. The process 300 continues at decision block 310.

Figure 4:
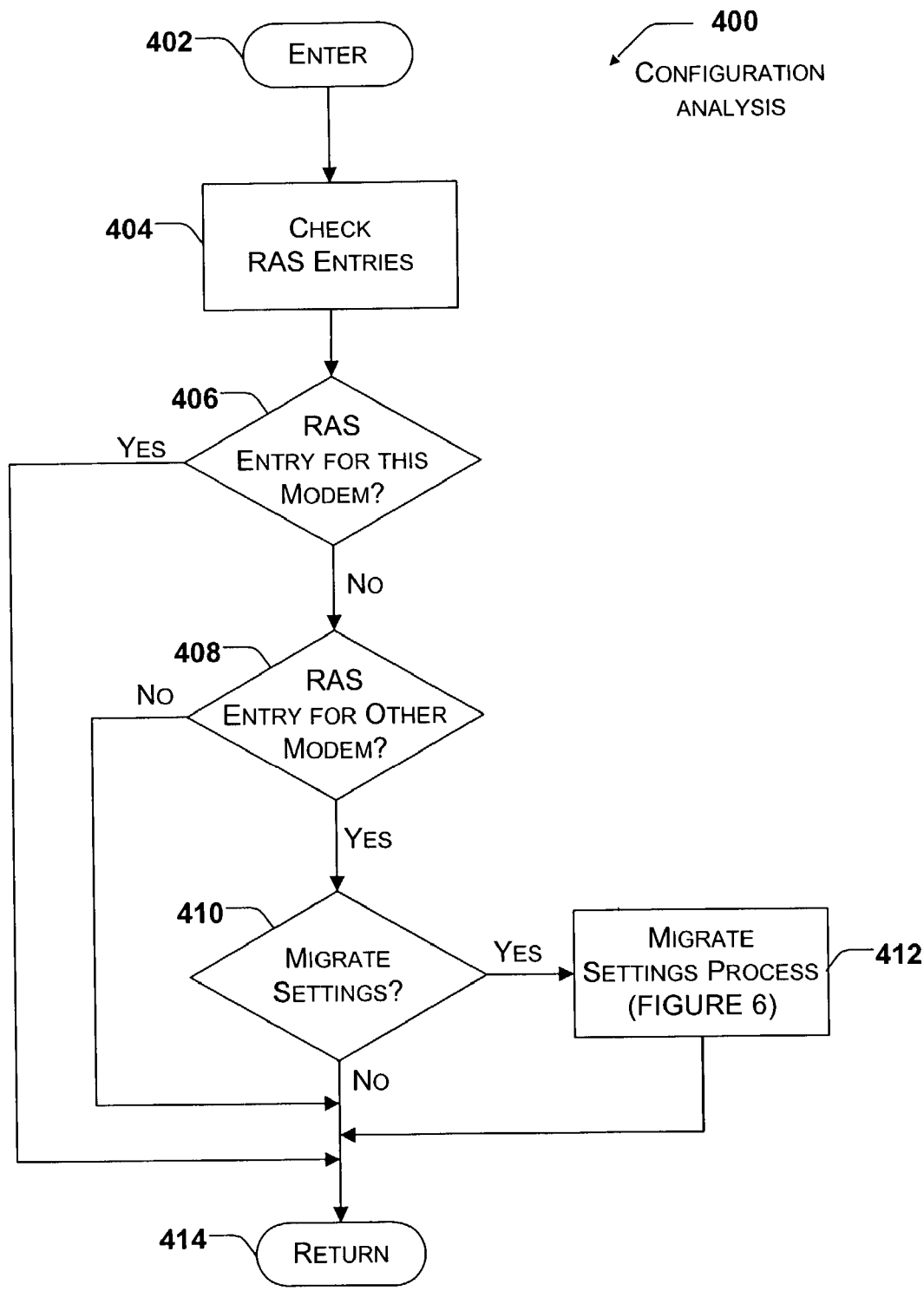
FIG. 4 is a logical flow diagram of a configuration analysis process in accordance with the present invention.
Figure 5:
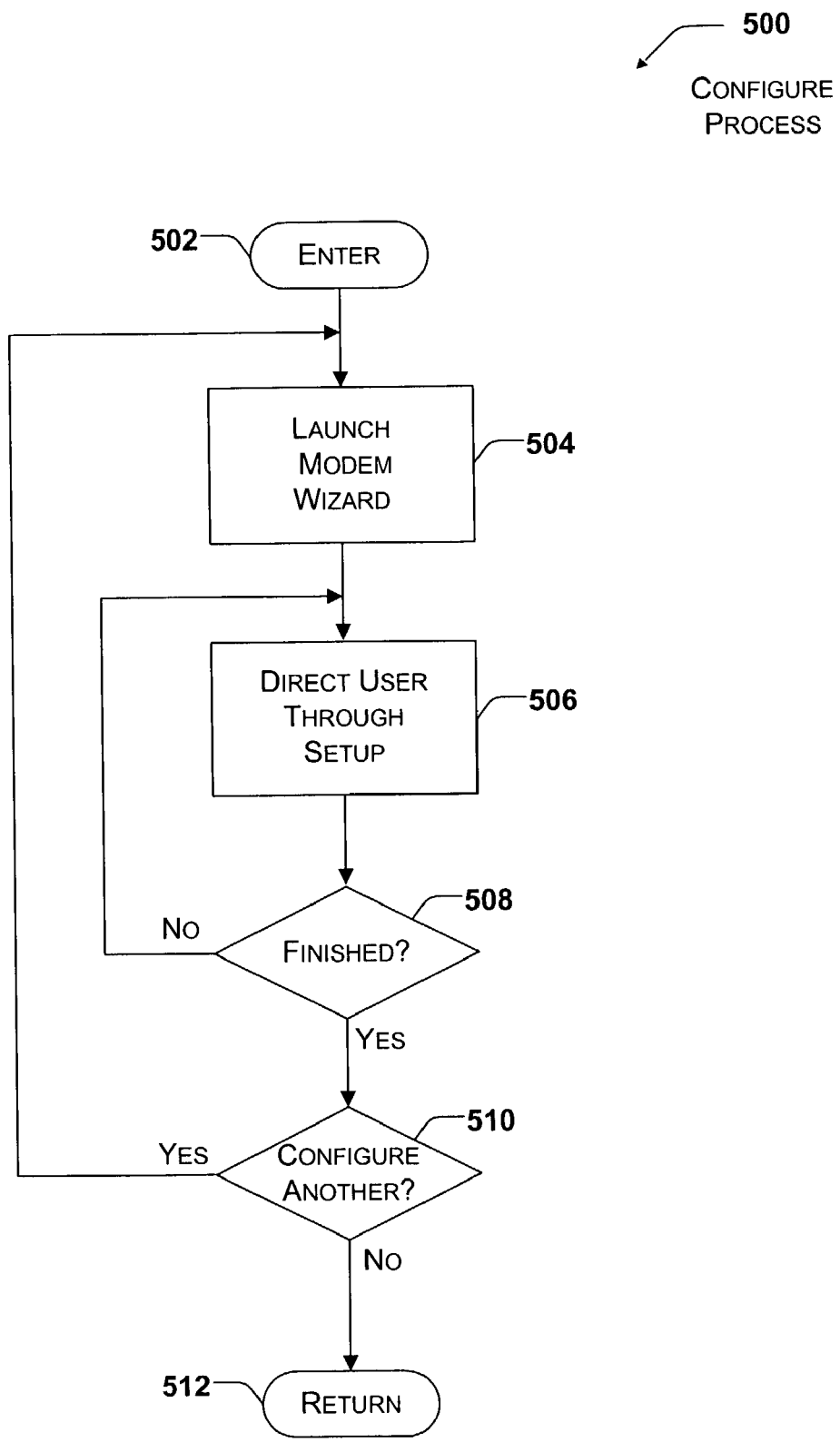
FIG. 5 is a logical flow diagram of a configuration process in accordance with the present invention.

At decision block 310, a determination is made whether to configure the mobile device to use the connected modem. The determination may be made by a user. For example, if the connected modem has not yet been configured for use with the mobile device once the configuration analysis process of FIG. 4 is complete, the user may be prompted to choose whether to configure the modem. A window opens that notifies the user that the modem has not been configured, and then requests the user whether to launch the configuration process described in FIG. 5. In another embodiment, the configuration process may be launched without inquiring the user first. The determination of whether to configure the modem also depends on whether a user has chosen to migrate the settings of another modem to the connected modem according to the process of FIG. 6 described below. If a user has chosen to migrate the settings, then the configuration process of FIG. 5 is unnecessary.

If a decision is made not to configure the connected modem, then the process 300 advances to block end 314 where the process ends. Alternatively, if a decision is made to configure the connected modem, the process continues to block 312.

At block 312, the connected modem is configured (i.e. installed) for the mobile device. The configuration process is described in the discussion of FIG. 5 below. Once the modem is configured, the process 300 moves to block 408, where the process ends.

In one embodiment, process 300 does not end if a decision is made not to configure the connected modem. Instead, the window requesting the user to configure the modem persists as a window or an icon of a navigation bar until the user chooses to configure the modem. Preventing the user from dismissing the window without configuring ensures that the user can access the window again in the event that the user accidentally "hides" the window.

FIG. 4 is a logical flow diagram of a configuration analysis process 400 in accordance with the present invention. The process 400 enters at block 402 when process 300 shown in FIG. 3 enters block 308. Processing continues at block 404.

At block 404, the "RAS" (Remote Access Service) or "DUN" (Dial-Up Networking) entries of the mobile device are checked (RAS and DUN are used interchangeably through the remainder of the application). Each modem configured for use on the mobile device has a RAS entry. Each RAS entry is unique for each model of modem configured for use with the mobile device. Processing continues at decision block 406.

At decision block 406, a determination is made whether a RAS entry exists for the modem currently connected to the mobile device. As previously stated, each RAS entry is unique for each model of modem used. For example, a modem of model X produced by manufacturer A has a different RAS entry than a modem of model Z produced by manufacturer B. Similarly, modems of model X and model Y produced by the same manufacturer (e.g., manufacturer A) also have different RAS entries. Accordingly, the RAS entries may be differentiated for different modems connected to the mobile device.

If a determination is made that a RAS entry exists for the currently connected modem, then the process 400 advances to return block 414, where the process returns to process 300 of FIG. 3 at decision block 310. Since a RAS entry exists for the currently connected modem, configuration of the modem is not necessary, and the determination at decision block 310 is made accordingly. Alternatively, if a determination is made that there is no RAS entry for the modem connected to the mobile device, processing continues at decision block 408.

At decision block 408, a determination is made whether another RAS entry exists for another modem on the mobile device. Another RAS entry indicates that a user has completed a configuration process previously. The previous configuration may be used to automatically configure the connected modem for use with the mobile device. The settings associated with the previous configuration may be used to propagate the settings for the connected modem. If no other RAS entry is present on the mobile device, than the modem requires configuration before use, and processing continues to return block 414. At return block 414, the process 400 returns to process 300 at block 310. At block 310, the user may decide to proceed with the configuration of the connected modem, or avoid the configuration at this time.

Alternatively, if another RAS entry exists, the processing moves to decision block 410. At decision block 410, a determination is made whether to migrate the setting associated with the other RAS entry of the different modem to establish the settings of the connected modem. The determination may be made by the user. In one embodiment, when the user chooses to migrate the settings, the settings are transferred automatically without user intervention. In another embodiment, the user is guided through a process for migrating the settings from the previously used modem to the connected modem similar to process 600 of FIG. 6.

If the user chooses not to migrate the settings, the process 400 advances to return block 414, where the process returns to process 300 of FIG. 3 at block 310. Since the user decided not to migrate the settings, the user may choose at block 310 to be guided through the configuration process of FIG. 5 or avoid the configuration at this time.

Figure 6:
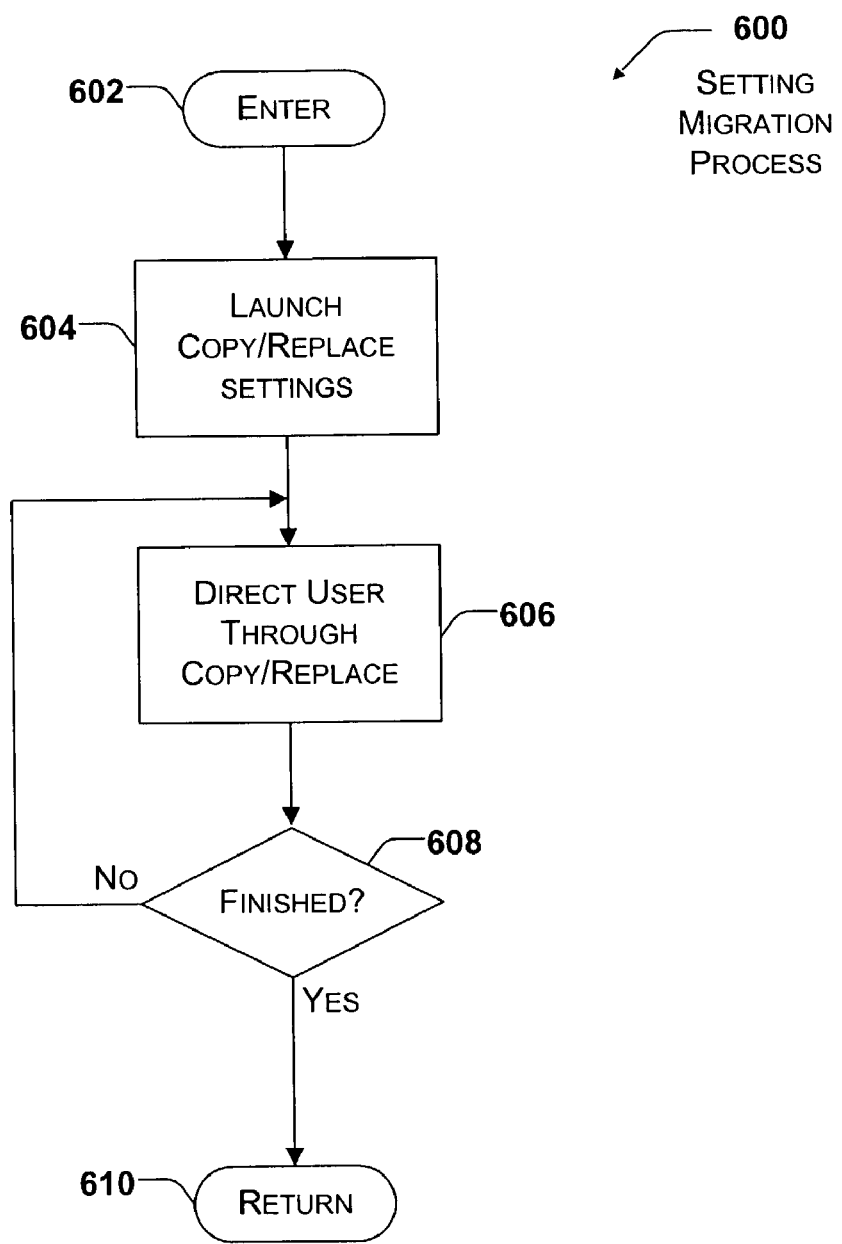
FIG. 6 is a logical flow diagram of a setting migration process in accordance with the present invention.

Alternatively, if the user chooses to migrate the settings at decision block 410, then processing moves to block 412. At block 412, the user is guided through a process for migrating the settings from one modem to establish the settings for the connected modem. The process is described in greater detail with respect to FIG. 6. Once the setting migration process of FIG. 6 is complete, processing advances to return block 414, where the process returns to process 300 of FIG. 3 at block 310. Since the user chose to migrate the settings, configuration of the currently connected modem is not required, and the decision at block 310 is made accordingly.

FIG. 5 is a logical flow diagram of a configuration process in accordance with the present invention. The process 500 enters at block 502 when process 300 shown in FIG. 3 enters block 312. Processing continues at block 504.

At block 504, a "wizard" is launched to guide the user through the configuration process. The wizard refers to a utility that is used for the particular purpose of installing the modem settings and associated programs on the mobile device. Once the wizard is launched, processing moves to block 506.

At block 506, the user is guided through the setup process or configuration process for installation of the utilities and/or dial-up properties of the connected modem. In one embodiment, the user is prompted to fill in data fields with information regarding the dial-up procedures for which the user has subscribed. The user enters telephone numbers and preferences for initiating and maintaining a network connection using the connected modem. In one embodiment, the user can cancel the configuration procedures and exit the wizard at any time throughout process 500. As the user guided through the configuration of the connected modem, processing continues to decision block 508.

At decision block 508, a determination is made that the user is finished with the configuration. In one embodiment, the user is finished with the configuration process when all data fields necessary for establishing and maintaining a network connection are correctly entered. If the user is not finished with the configuration, the process 500 returns to block 506 where the user continues to setup the modem for connectivity. If the user is finished with the configuration, processing moves to decision block 510.

At decision block 510, the user is prompted as to whether the user desires to setup either an alternate configuration for the connected modem, or another modem. If the user is finished with all desired configurations, processing moves to return block 512, where the process 500 returns to process 300 of FIG. 3 at end block 314. Alternatively, if the user chooses to setup another configuration, the process 500 returns to block 504 where the modem wizard is launched to assist with the additional configurations.

In one embodiment, after the connected modem is inserted, the user is presented with a list of options for using the modem. For example, the list may include options such as "browse the Internet", "check email" and the like. Depending on the option selected, the appropriate application corresponding to the selection is automatically launched. Presenting the user with the list of options each time the modem is inserted further serves to improve the usability of the modem.

FIG. 6 is a logical flow diagram of a setting migration process in accordance with the present invention. The process 600 enters at block 602 when process 400 shown in FIG. 4 enters block 412. Processing continues at block 604.

At block 604, a utility is launched to copy the settings associated with an existing RAS entry of another modem to establish or replace the settings of a connected modem. The utility may be a wizard or other program to assist the user in migrating the settings from one modem to the other. Once the utility is launched, processing continues at block 606.

At block 606, the user is guided through the copy/replace process or migration process for migrating the setting and dial-up properties of one modem to establish the settings for the connected modem. In one embodiment, the user confirms the migrated settings as the settings are copied. As the user guided through the configuration of the connected modem, processing continues to decision block 608.

At decision block 608, a determination is made that the user is finished with migrating the settings. In one embodiment, the user is finished with migrating the settings when all data fields necessary for establishing and maintaining a network connection are correctly filled out for the connected modem. If the user is not finished with migrating the settings, the process 600 returns to block 606 where the user continues the migration process. If the user is finished with migrating the settings, processing moves to return block 610. At return block 610, processing returns to process 400 of FIG. 4 at return block 414.

In an alternative embodiment, the processes described in FIGS. 3-6 may be adjusted to increase the discoverability of external devices other than modems. The user may be prompted for other hardware insertions or peripheral devices, allowing the user to be stepped through the installation configuration process. The increased discoverability of the hardware installation process for mobile devices reduces the requirements on the user, improving user experience.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for configuring a peripheral device connected to a mobile device, the method comprising:
    determining when the peripheral device is connected to the mobile device;
    determining whether connectivity settings that are associated with another device have been previously configured for use with the mobile device;
    launching a utility to obtain the connectivity settings to configure the peripheral device for use with the mobile device when the peripheral device is connected to the mobile device and when the connectivity settings have not been previously configured on the peripheral device; and
    migrating connectivity settings associated with the another device to populate connectivity settings of the peripheral device.

2. The computer-implemented method of claim 1, wherein determining when the peripheral device is connected to the mobile device comprises determining when the peripheral device is a second modem.

3. The computer-implemented method of claim 2, wherein the another device is a first modem that has been previously connected to the mobile device.

4. The computer-implemented method of claim 3, further comprising migrating connectivity settings that were used to configure the first modem to the connectivity settings that are associated with the second modem.

5. The computer-implemented method of claim 1, wherein determining when the peripheral device is connected to the mobile device further comprises executing an internal process on the mobile device that monitors for a notification that a peripheral device is connected to the mobile device.

6. The computer-implemented method of claim 1, wherein determining whether the another device has been previously configured for use with the mobile device further comprises examining entries of the mobile device to determine whether at least one of the entries corresponds to the peripheral device.

7. The computer-implemented method of claim 1, wherein launching a utility includes launching a wizard.

8. The computer-implemented method of claim 1, further comprising canceling the configuration of peripheral device at the request of a user.

9. The computer-implemented method of claim 1, further comprising persistently displaying the utility until the connectivity settings are obtained.

10. The computer-implemented method of claim 1, further comprising providing a list of options for using the peripheral device after the peripheral device is configured for use on the mobile device.

11. The computer-implemented method of claim 10, wherein the mobile device automatically launches an associated application depending on which option is selected for using the peripheral device.

12. A method for configuring a modem connected to a mobile device, the method comprising:
    initiating an internal process to monitor when a first modem is connected to the mobile device;
    determining whether connectivity settings for a second modem have been previously configured for use with the mobile device; wherein the connectivity settings for the second modem are independent from an installation of a driver that is associated with the second modem; and
    launching a utility to configure the connectivity settings for the first modem for use with the mobile device when a configuration of the connectivity settings is not yet completed for the first modem on the mobile device; and
    migrating connectivity settings associated with the second modem to populate connectivity settings of the first modem.

13. The method of claim 12, further comprising determining whether the second modem has previously been configured and connected to the mobile device.

14. The method of claim 12, wherein determining whether the connectivity settings for the second modem have been previously configured for use with the mobile device further comprises examining remote access server (RAS) entries of the mobile device to determine whether at least one of the remote access server (RAS) entries corresponds to the second modem.

15. The method of claim 12, further comprising canceling the configuration of the first modem at the request of a user.

16. The method of claim 12, further comprising requesting whether to configure another modem upon completing the configuration of the first modem.

17. The computer-implemented method of claim 12, further comprising providing a list of options for using the first modem after the first modem is configured for use on the mobile device.

18. The computer-implemented method of claim 17, wherein the mobile device automatically launches an associated application depending on which option is selected for using the first modem.

19. A mobile device, comprising:
   a processor;
   a display;
   a memory into which a plurality of computer-executable instructions are loaded, the computer-executable instructions performing a method comprising:
   initiating an internal process to monitor when a first peripheral device is connected to the mobile device;
   determining whether connectivity settings associated with a second peripheral device have been previously configured for use with the mobile device;
   launching a utility to configure the connectivity settings that are associated with the first peripheral device; and
   migrating connectivity settings associated with the second peripheral device to populate connectivity settings of the first peripheral device.

20. The mobile device of claim 19, wherein determining whether the connectivity settings associated with the second peripheral device have been previously configured for use with the mobile device further comprises examining remote access server (RAS) entries of the mobile device to determine whether at least one of the remote access server (RAS) entries corresponds to the second peripheral device.

21. The mobile device of claim 19, further comprising canceling the configuration of the first peripheral device at the request of a user.

22. The mobile device of claim 19, further comprising requesting a user to choose whether to configure another peripheral device upon completing the configuration of the first peripheral device.

23. The mobile device of claim 19, further comprising providing a list of options for using the first peripheral device after the first peripheral device is configured for use on the mobile device.

24. The mobile device of claim 23, wherein an associated application is automatically launched depending on which option is selected for using the first peripheral device.

* * * * *